US011745777B2

(12) United States Patent
Yang

(10) Patent No.: US 11,745,777 B2
(45) Date of Patent: Sep. 5, 2023

(54) CART WITH SUNSHADE CONNECTING DEVICE

(71) Applicant: Zhejiang Hengfeng Top Leisure Co., Ltd., Zhejiang (CN)

(72) Inventor: Baoqing Yang, HangZhou (CN)

(73) Assignee: Zhejiang Hengfeng Top Leisure Co., Ltd., Zhejiang (CN)

( * ) Notice: Subject to any disclaimer, the term of this patent is extended or adjusted under 35 U.S.C. 154(b) by 0 days.

(21) Appl. No.: 17/668,477

(22) Filed: Feb. 10, 2022

(65) Prior Publication Data

US 2023/0037666 A1 Feb. 9, 2023

(30) Foreign Application Priority Data

Aug. 6, 2021 (CN) .......................... 202121836186.6

(51) Int. Cl.
*B62B 3/02* (2006.01)
*B62B 5/00* (2006.01)

(52) U.S. Cl.
CPC .............. *B62B 3/02* (2013.01); *B62B 5/0013* (2013.01)

(58) Field of Classification Search
CPC ........ B62B 3/02; B62B 5/0013; B62B 3/007; B62B 9/142; E04H 15/60; E04H 15/06
See application file for complete search history.

(56) References Cited

U.S. PATENT DOCUMENTS

| 5,178,174 | A  | * | 1/1993  | Wu ....................... A45B 25/143 |
|           |    |   |         | 135/25.4                              |
| 5,632,290 | A  | * | 5/1997  | Ling Kuo ............ A45B 25/143     |
|           |    |   |         | 135/25.4                              |
| 6,199,571 | B1 | * | 3/2001  | Lin ........................ A45B 25/16  |
|           |    |   |         | 135/25.1                              |
| 6,341,613 | B1 | * | 1/2002  | Wu ...................... A45B 25/143  |
|           |    |   |         | 135/25.1                              |
| 7,628,369 | B2 | * | 12/2009 | Chen ....................... F16B 7/105 |
|           |    |   |         | 248/354.3                             |
| 9,145,154 | B1 | * | 9/2015  | Horowitz .............. B62B 5/0013   |
| 9,248,072 | B2 | * | 2/2016  | Wu ........................... F16B 7/14 |

(Continued)

FOREIGN PATENT DOCUMENTS

| CN | 204599739 U    | * | 9/2015 |              |
|----|----------------|---|--------|--------------|
| CN | 109398447 A    | * | 3/2019 | ............... B62B 3/02 |
| WO | WO-2019070555 A1 | * | 4/2019 | ............. B63B 17/02 |

*Primary Examiner* — James A Shriver, II
*Assistant Examiner* — Ian Bryce Shelton
(74) *Attorney, Agent, or Firm* — Thompson Coburn LLP

(57) ABSTRACT

A cart has a sunshade connecting device that includes a standpipe upper joint with a standpipe mounting hole that receives a standpipe of the cart and a plug-in mounting hole that receives a sunshade seat. A mounting groove is positioned above the plug-in mounting hole. A quick release button clamp is arranged in the mounting groove and adapted to engage a fixing groove on the sunshade seat. A plug head mechanism is configured for pushing the sunshade seat upward out of the plug-in mounting hole. The sunshade seat may be plugged into the plug-in mounting hole with the quick release button engaged with the fixing groove to fix the sunshade seat. When the sunshade needs to be removed, the quick release button may be pressed and disengaged from the fixing groove of the sunshade seat. The plug head mechanism may then eject the sunshade seat from the plug-in mounting hole.

13 Claims, 7 Drawing Sheets

(56) References Cited

U.S. PATENT DOCUMENTS

| | | | | |
|---|---|---|---|---|
| 9,956,981 | B1* | 5/2018 | Fitzwater | E04H 15/60 |
| 9,975,565 | B1* | 5/2018 | Liao | B62B 3/02 |
| 10,040,470 | B1* | 8/2018 | Horowitz | B62B 3/102 |
| 10,292,468 | B2* | 5/2019 | You | A45B 25/16 |
| 10,676,117 | B2* | 6/2020 | Fitzwater | B62B 5/0013 |
| 11,370,467 | B1* | 6/2022 | Horowitz | B62B 3/007 |
| 2010/0090444 | A1* | 4/2010 | Chen | B62B 3/106 |
| | | | | 280/651 |
| 2015/0329135 | A1* | 11/2015 | Sun | B62B 7/142 |
| | | | | 280/649 |
| 2018/0118246 | A1* | 5/2018 | Fitzwater | B62B 5/082 |
| 2020/0324860 | A1* | 10/2020 | Popa | E04H 15/60 |
| 2022/0097748 | A1* | 3/2022 | Ma | B62B 5/04 |

\* cited by examiner

CART WITH SUNSHADE CONNECTING DEVICE

RELATED APPLICATION DATA

This application claims priority benefit to Chinese utility model application serial no. 202121836186.6 filed Aug. 6, 2021, the disclosure of which is incorporated by reference herein.

FIELD

The present application relates to the field of foldable carts, and in particular to a sunshade connecting device for such foldable carts.

BACKGROUND

In order to prevent people or objects on a foldable cart from being exposed to direct sunlight, the foldable cart is generally equipped with a sunshade. In the conventional technology, the sunshade rod is generally plugged into a foldable cart standpipe, and the sunshade rod is position-limited by screws or rivets. However, the existing connection method in which the sunshade rod is plugged into the foldable cart standpipe is not convenient for disassembly and assembly.

Therefore, a technical problem to be addressed urgently by those skilled in the art is to provide a sunshade connecting device that is convenient for disassembly and assembly.

SUMMARY

An object of the present application is to provide a cart with a sunshade connecting device, in which a sunshade seat is pushed upward by a plug head mechanism, and a quick release button is clamped with a fixing groove of the sunshade seat, so as to prevent the sunshade seat from being detached from a plug-in mounting hole, and the quick disassembly and assembly of the sunshade seat is realized.

In order to achieve the above object, a sunshade connecting device of the cart is provided according to the present application, and the sunshade connecting device includes a standpipe upper joint and a sunshade seat, where the standpipe upper joint comprises a standpipe mounting hole for plugging into and connecting with the foldable cart standpipe and a plug-in mounting hole for plugging into the sunshade seat. A fixing groove is defined on an outer side wall of the sunshade seat, and a mounting groove is defined in the standpipe upper joint, and the bottom of the mounting groove is in communication with the plug-in mounting hole. A quick release button that can be clamped with the fixing groove when the sunshade seat is plugged into the plug-in mounting hole is arranged in the mounting groove, and a plug head mechanism for pushing the sunshade seat upward to out of the plug-in mounting hole is arranged in the standpipe upper joint.

Preferably, the plug head mechanism includes a cylindrical plug head seat and a sunshade-hole plug head, and the plug head seat has a blind mounting hole extending downward from an upper end surface of the plug head seat and along the axis of the plug head seat, and the sunshade-hole plug head is arranged in the blind mounting hole. A plug head pressure spring for supporting the sunshade-hole plug head is arranged at the bottom of the blind mounting hole, and a limiting groove for clamping with the quick release button is defined on an outer side wall of the sunshade-hole plug head.

Preferably, the plug head mechanism includes a cylindrical plug head seat and a sunshade-hole plug head, and the plug head seat has a blind mounting hole extending downward from an upper end surface of the plug head seat and along the axis of the plug head seat, and the sunshade-hole plug head is arranged in the blind mounting hole. A through hole penetrating in the axial direction is defined at the bottom of the blind mounting hole, and the sunshade-hole plug head includes a plug head body and a guide rod located below the plug head body, and the guide rod is in clearance fit with the through hole. A lower end of the guide rod extends through the through hole to a position located below the plug head seat, a position-limiting boss is arranged at a lower end of the guide rod, and the diameter of the position-limiting boss is larger than the bore diameter of the through hole. A plug head compression spring is sleeved on the outer circumference of the guide rod, one end of the plug head compression spring abuts against a bottom surface of the blind mounting hole, and the other end of the plug head compression spring abuts against the plug head body.

Preferably, the sunshade-hole plug head has a blind guide hole extending upward from a lower end surface of the sunshade-hole plug head along the axis of the sunshade-hole plug head, and the plug head compression spring is plugged into the blind guide hole and abuts against a bottom surface of the blind guide hole.

Preferably, a clamping ring platform is circumferentially arranged on an outer side wall located at an upper end of the plug head seat, and when the plug head seat is plugged into the foldable cart standpipe, the clamping ring platform abuts against an upper end surface of the foldable cart standpipe.

Preferably, a position-limiting groove for clamping and cooperating with the quick release button is defined on an outer side wall of the plug head body.

Preferably, a clamping ring platform is circumferentially arranged on an outer side wall located at an upper end of the plug head seat, and when the plug head seat is plugged into the foldable cart standpipe, the clamping ring platform abuts against an upper end surface of the foldable cart standpipe.

Preferably, the quick release button has a through hole penetrating in the thickness direction, and a locking spring is arranged between the quick release button and the bottom of the mounting groove.

Preferably, the quick release button has a through hole penetrating in the thickness direction, the quick release button is provided with a locking boss, and a locking spring is arranged between the locking boss and the mounting groove.

The sunshade connecting device provided according to the present application includes the standpipe upper joint and the sunshade seat, where the standpipe upper joint includes the standpipe mounting hole for plugging into and connecting with the foldable cart standpipe and the plug-in mounting hole for plugging into the sunshade seat. The fixing groove is defined on the outer side wall of the sunshade seat, and the mounting groove is defined in the standpipe upper joint, and the bottom of the mounting groove is in communication with the plug-in mounting hole. The quick release button that can be clamped with the fixing groove when the sunshade seat is plugged into the plug-in mounting hole is arranged in the mounting groove, and the plug head mechanism for pushing the sunshade seat upward to out of the plug-in mounting hole is arranged in the standpipe upper joint.

When mounting the sunshade, the sunshade seat is connected to the sunshade rod. The sunshade seat is plugged into the plug-in mounting hole while the quick release button is clamped with the fixing groove on the outer side wall of the sunshade seat to fix the sunshade seat. At this time, the plug head mechanism abuts against the sunshade seat and exerts an upward thrust on the sunshade seat. When the sunshade needs to be removed, the quick release button is pressed, so that the quick release button is detached from the clamping connection with the fixing groove. The sunshade seat leaves the plug-in mounting hole under the push of the plug head mechanism to remove the sunshade. The sunshade connecting device can realize the quick disassembly and assembly of the sunshade, which reduces the difficulty of disassembly and assembly.

BRIEF DESCRIPTION OF THE DRAWINGS

For more clearly illustrating embodiments of the present application or the technical solutions in the conventional technology, drawings referred to for describing the embodiments or the conventional technology will be briefly described hereinafter. Apparently, drawings in the following description are only examples of the present application, and for the person skilled in the art, other drawings may be obtained based on the provided drawings without any creative efforts.

Figure 1:
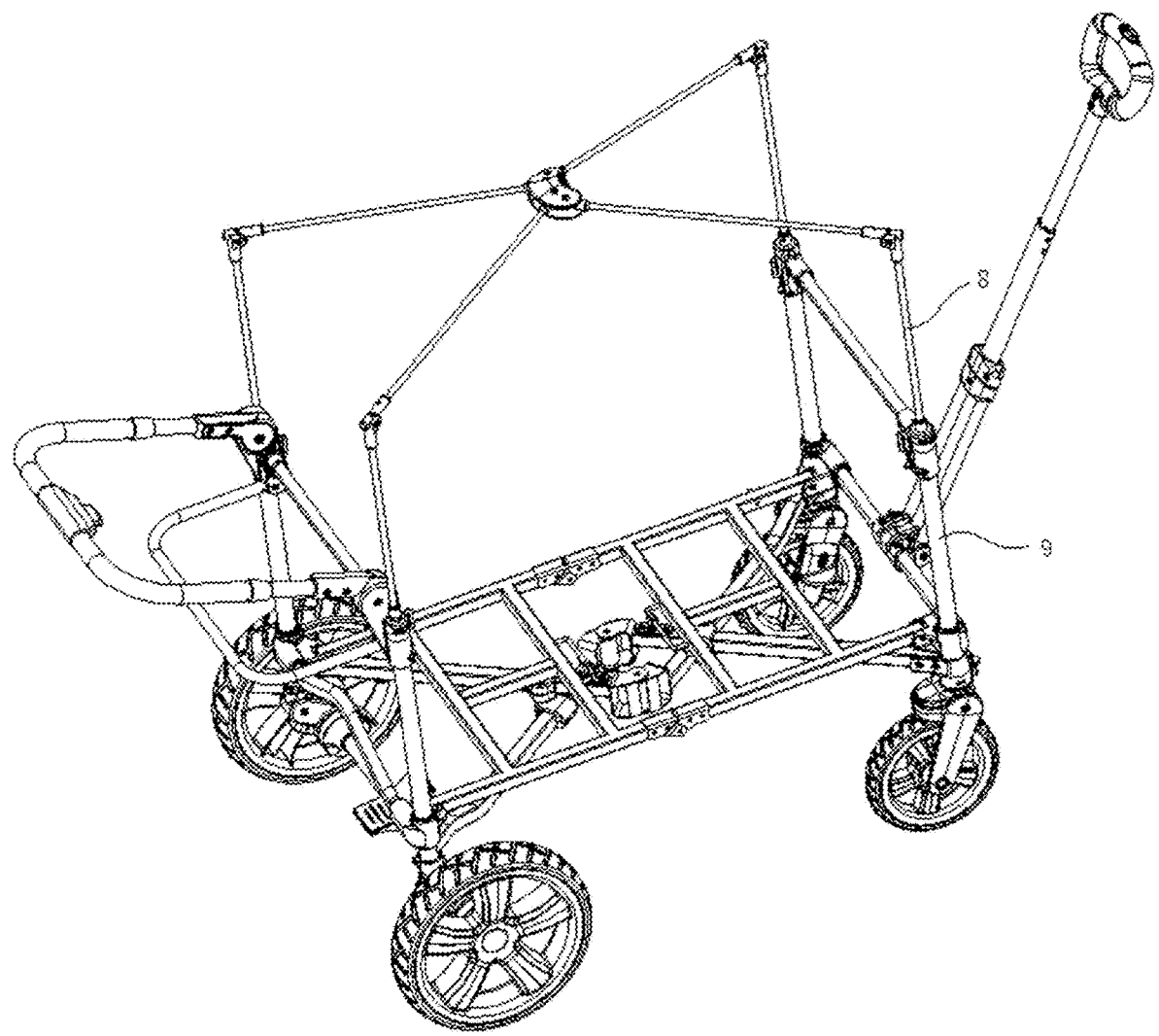
FIG. 1 is a schematic structural view of a sunshade connecting device provided according to the present application connected to a foldable cart.

Reference numerals in FIGS. 1 to 7:

DETAILED DESCRIPTION OF THE EMBODIMENTS

The technical solutions according to the embodiments of the present disclosure will be described clearly and completely as follows in conjunction with the drawings in the embodiments of the present disclosure. It is apparent that the described embodiments are only a part of the embodiments according to the present disclosure, rather than all of the embodiments. Based on the embodiments in the present disclosure, all of other embodiments, made by the person skilled in the art without any creative efforts, fall into the scope of protection of the present disclosure.

In order to provide the person skilled in the art with a better understanding of the solution of the present application, the present application is described hereinafter in further detail in conjunction with the drawings and embodiments.

Figure 2:
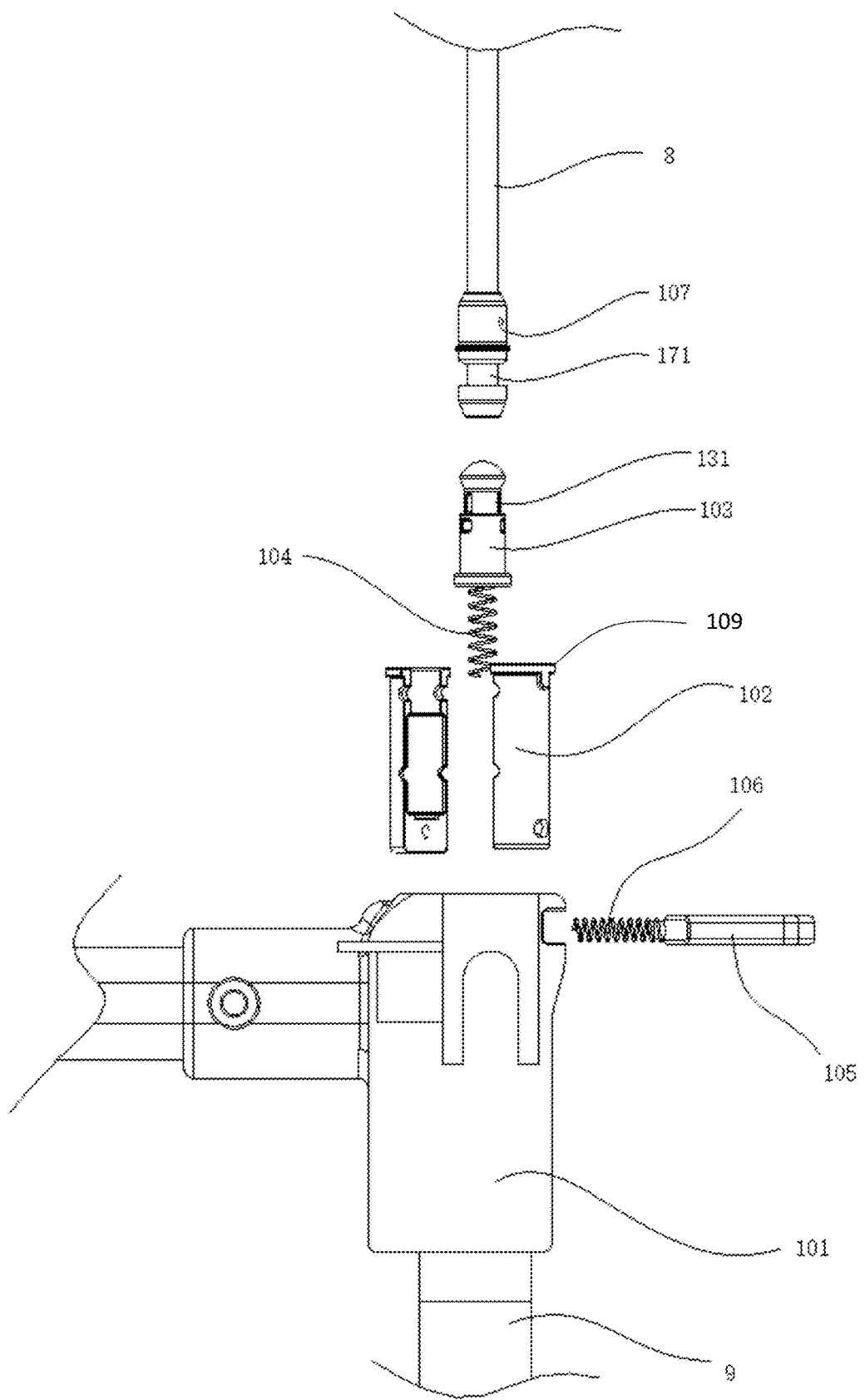
FIG. 2 is a exploded view of a first specific embodiment of the sunshade connecting device.
Figure 3:
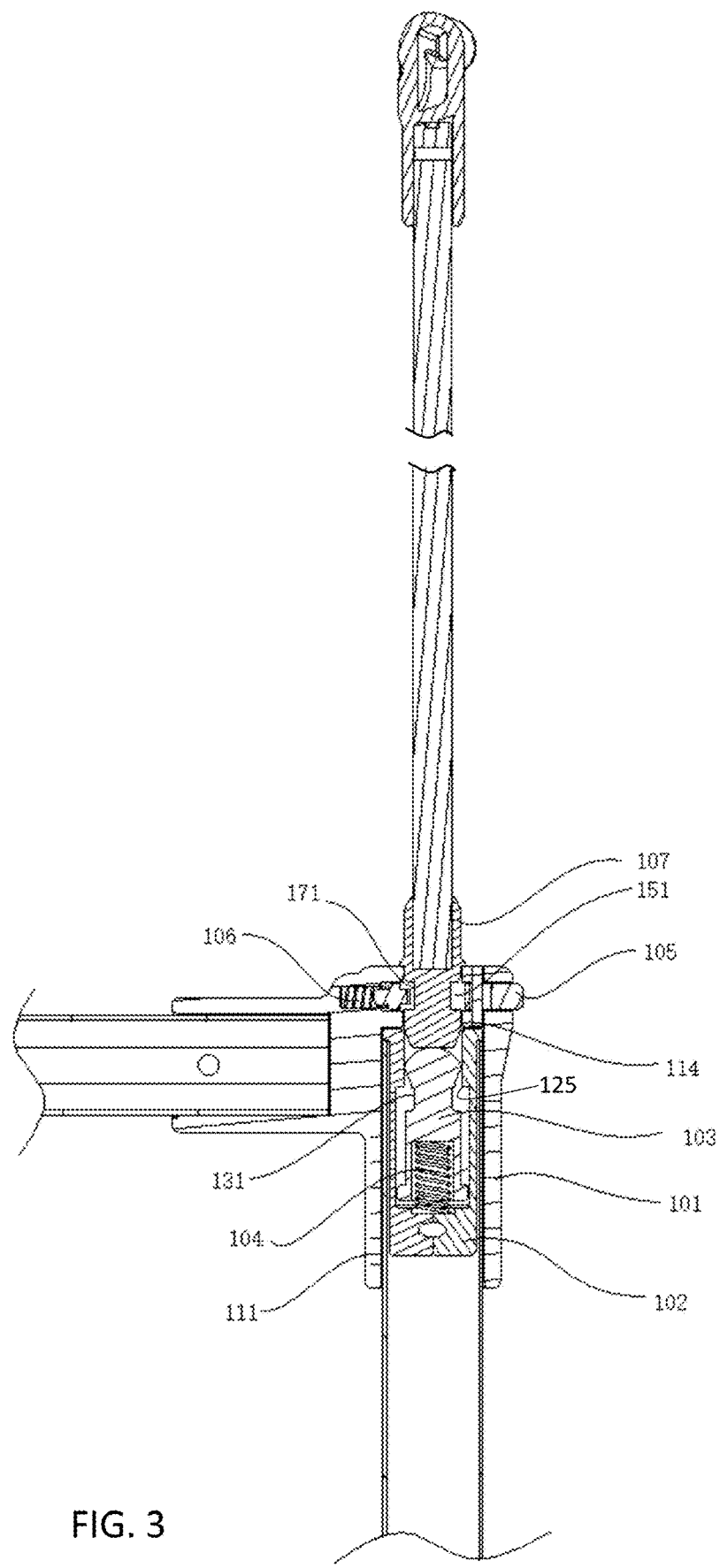
FIG. 3 is a cross-sectional view of the sunshade connecting device shown in FIG. 2 connected to a sunshade.
Figure 4:
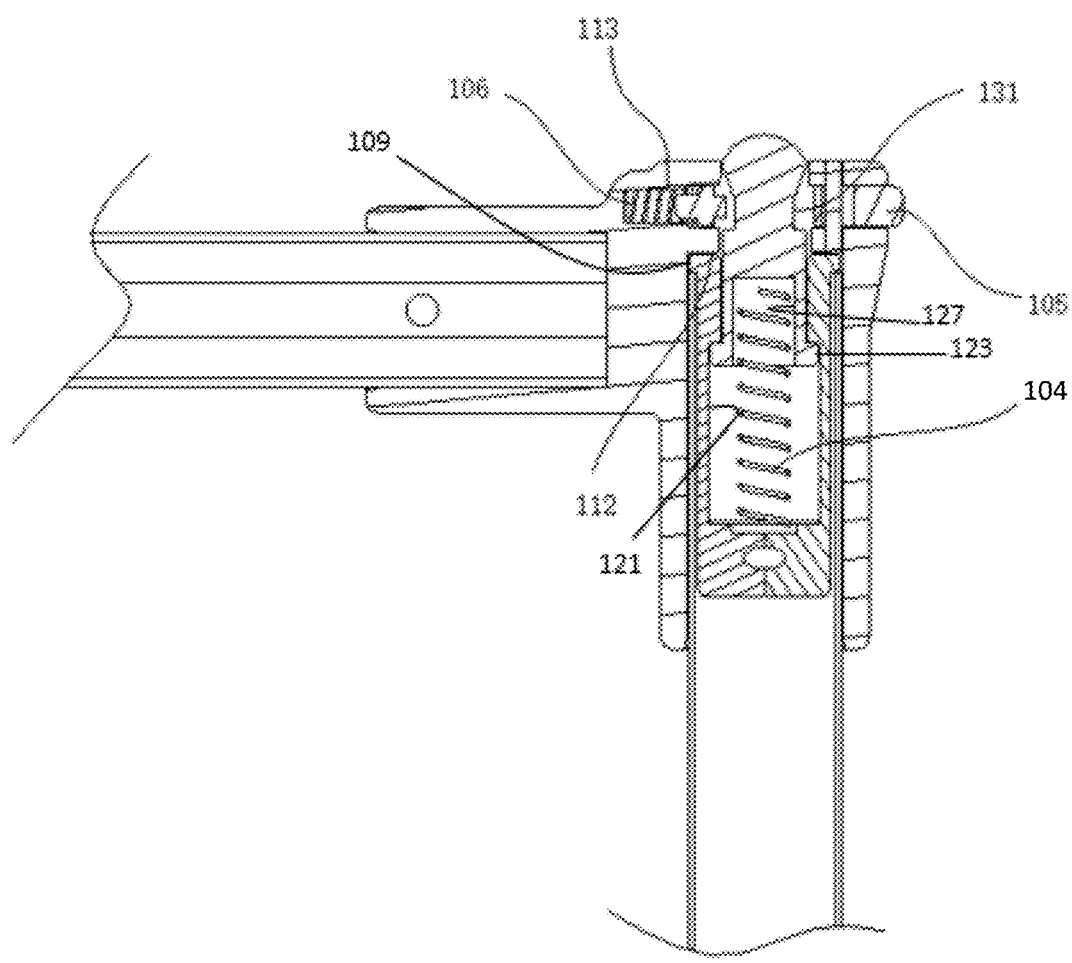
FIG. 4 is a cross-sectional view of the sunshade connecting device shown in FIG. 2.
Figure 5:
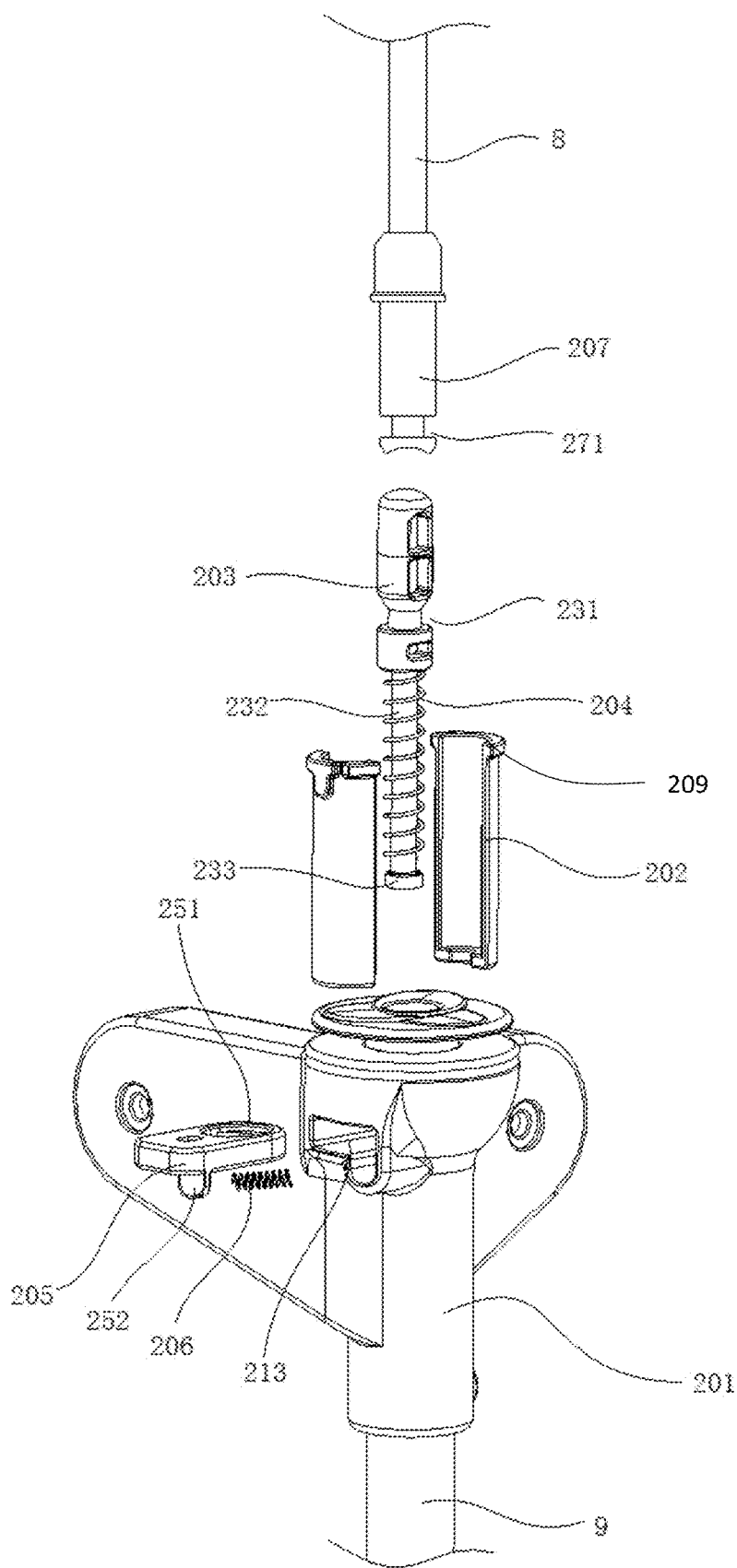
FIG. 5 is an exploded view of a second specific embodiment of the sunshade connecting device.
Figure 6:
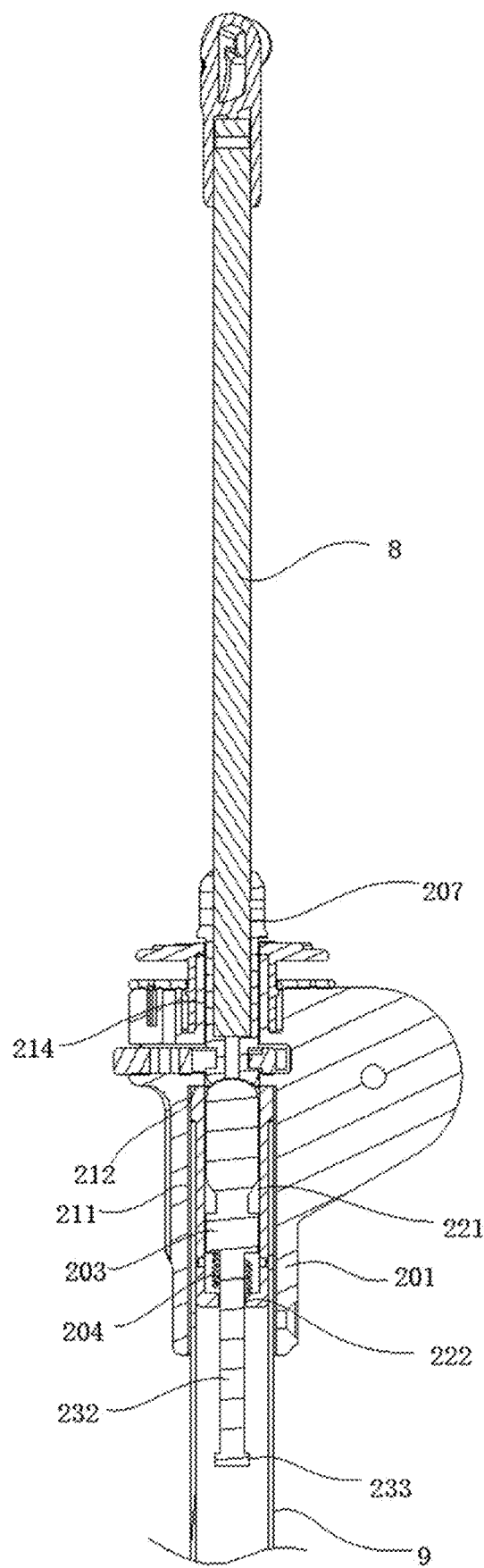
FIG. 6 is a cross-sectional view of the sunshade connecting device shown in FIG. 5 connected to the sunshade.
Figure 7:
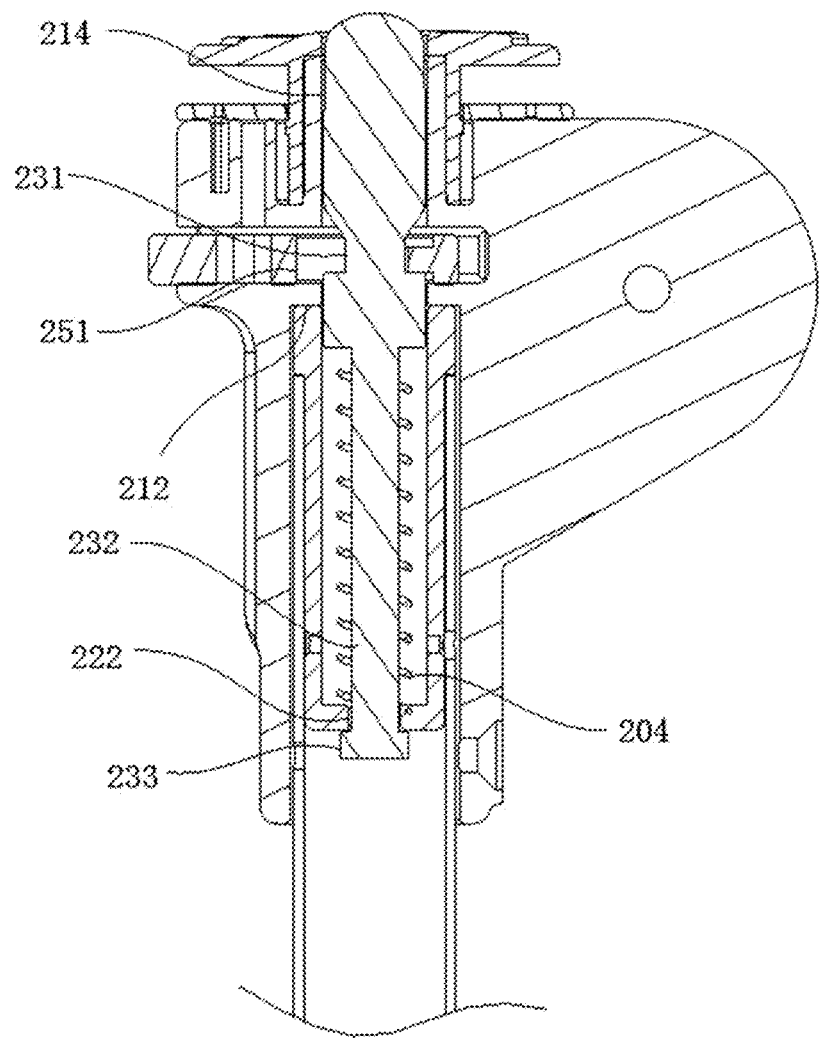
FIG. 7 is a cross-sectional view of the sunshade connecting device shown in FIG. 5.

Reference is made to FIGS. 1 to 7, where FIG. 1 is a schematic structural view of a sunshade connecting device provided according to the present application connected to a foldable cart. FIG. 2 is an exploded view of a first specific embodiment of the sunshade connecting device. FIG. 3 is a cross-sectional view of the sunshade connecting device shown in FIG. 2 connected to the sunshade. FIG. 4 is a cross-sectional view of the sunshade connecting device shown in FIG. 2. FIG. 5 is an exploded view of a second specific embodiment of the sunshade connecting device. FIG. 6 is a cross-sectional view of the sunshade connecting device shown in FIG. 5 connected to the sunshade; and FIG. 7 is an cross-sectional view of the sunshade connecting device shown in FIG. 5.

The structure of the sunshade connecting device of the cart provided according to the present application is shown in FIG. 2 or FIG. 5, and the sunshade connecting device includes a standpipe upper joint, a sunshade seat and a plug head mechanism. The standpipe upper joint is connected to a foldable cart standpipe 9, and the sunshade seat is connected to a sunshade rod 8. A standpipe mounting hole and a plug-in mounting hole are defined on the standpipe upper joint. The foldable cart standpipe 9 can be plugged into the standpipe mounting hole. The upper end of the standpipe mounting hole has a position-limiting stepped surface 112, 212 which performs axial position limiting to the foldable

| | | | |
|---|---|---|---|
| 8 | sunshade rod, | 9 | foldable cart standpipe, |
| 101 | standpipe upper joint, | 102 | plug head seat, |
| 103 | sunshade-hole plug head, | 104 | plug head pressure spring, |
| 105 | quick release button, | 106 | locking spring, |
| 107 | sunshade seat, | 109 | clamping ring platform, |
| 111 | standpipe mounting hole, | 112 | position-limiting stepped surface, |
| 113 | mounting groove, | 114 | plug-in mounting hole, |
| 121 | blind mounting hole, | 123 | position-limiting ring platform, |
| 125 | position-limiting platform, | 131 | position-limiting groove, |
| 151 | through hole, | 171 | fixing groove, |
| 201 | standpipe upper joint, | 202 | plug head seat, |
| 203 | sunshade-hole plug head, | 204 | plug head pressure spring, |
| 205 | quick release button, | 206 | locking spring, |
| 207 | sunshade seat, | 209 | clamping ring platform |
| 211 | standpipe mounting hole, | 212 | position-limiting stepped surface, |
| 213 | mounting groove, | 214 | plug-in mounting hole, |
| 221 | blind mounting hole, | 222 | through hole, |
| 231 | position-limiting groove, | 232 | guide rod, |
| 233 | position-limiting boss, | 251 | through hole, |
| 252 | locking boss, | 271 | fixing groove. | cart standpipe 9. The sunshade seat 107,207 can be plugged into the plug-in mounting hole 114,214, and the plug head mechanism is arranged below the sunshade seat. The plug head mechanism is provided with a pushing part such as a spring, which is configured to push the sunshade seat upward, so as to push the sunshade seat out from the plug-in mounting hole. In order to ensure that the sunshade seat can be fixed in the plug-in mounting hole, a fixing groove is defined on an outer side wall of the sunshade seat along the circumferential direction of the sunshade seat, and a mounting groove is defined on the outer side wall of the standpipe upper joint, and the mounting groove is in communication with the plug-in mounting hole. The sunshade connecting device further includes a quick release button, which can be plugged into the mounting groove and be clamped with the fixing groove of the sunshade seat, so as to axially position-limit the sunshade seat, so that the sunshade seat can be fixed in the plug-in mounting hole.

In an embodiment, in the present application, the mounting hole and the plug-in mounting hole are arranged coaxially, and the diameter of the mounting hole is larger than that of the plug-in mounting hole, so that the position-limiting stepped surface can be formed at the upper end of the mounting hole. The plug head mechanism can be mounted on the foldable cart standpipe 9, so as to make full use of the space in the standpipe upper joint and reduce the volume of the standpipe upper joint. A user may also arrange the position of the plug-in mounting hole and the mounting hole according to the needs, and in a case that the plug-in mounting hole and the mounting hole are not arranged coaxially, the plug head mechanism can be arranged at the lower part of the plug-in mounting hole.

In this embodiment, in the sunshade connecting device, the sunshade seat is plugged into and cooperates with the plug-in mounting hole, and the quick release button is clamped with and cooperates with the fixing groove of the sunshade seat to mount the sunshade. In addition, the sunshade connecting device is further provided with the plug head mechanism, which pushes the sunshade seat upward. When the quick release button is detached from the fixing groove, the plug head mechanism pushes the sunshade seat out of the plug-in mounting hole, so as to realize the quick disassembly of the sunshade.

In a specific embodiment of the present application, the structure of the sunshade connecting device is shown in FIG. 2 to FIG. 4. The plug head mechanism includes a plug head seat 102 and a sunshade-hole plug head 103, both of which are cylindrical. The plug head seat 102 can be plugged into the foldable cart standpipe 9. A clamping ring platform 109 is arranged on an outer side wall at an upper end of the plug head seat 102 in the circumferential direction of the plug head seat 102, and the outer diameter of the clamping ring platform is larger than the inner diameter of the foldable cart standpipe 9 and smaller than the inner diameter of a standpipe mounting hole 111. Therefore, when the plug head seat 102 is plugged into the foldable cart standpipe 9, the clamping ring platform 109 abuts against the upper end surface of the foldable cart standpipe 9. At the same time, a standpipe upper joint 101 is mounted on the foldable cart standpipe 9, and the upper end surface of the plug head seat 102 abuts against the position-limiting stepped surface 112 to fix the plug head seat 102.

The plug head seat 102 has a blind mounting hole 121 extending downward from the upper end surface along the axis of the plug head seat 102, and the sunshade-hole plug head 103 is arranged in the blind mounting hole 121. A plug head compression spring 104 is arranged between the sunshade-hole plug head 103 and the bottom of the blind mounting hole 121, and the plug head compression spring 104 is in a compressed state, so as to push the sunshade-hole plug head 103 upward to make the sunshade-hole plug head 103 abut against a sunshade seat 107. When the quick release button 105 is detached from the fixing groove 171, the sun sunshade seat 107 is pushed by the sunshade-hole plug head 103 to out of the plug-in mounting hole 114. At the same time, it is necessary to prevent the sunshade-hole plug head 103 from being detached from the blind mounting hole 121. A position-limiting ring platform 123 is arranged on the outer wall of the sunshade-hole plug head 103 in the circumferential direction of the sunshade-hole plug head 103. The diameter of the upper part of the blind mounting hole 121 is smaller than the diameter of the lower part of the blind mounting hole 121, and therefore a position-limiting platform 125 facing downward is formed in the blind mounting hole 121, and the position-limiting platform 125 cooperates with the position-limiting ring 123 platform to prevent the sunshade-hole plug head 103 from being detached from the blind mounting hole 121. In addition, a position-limiting groove 131 is defined on the outer wall of the sunshade-hole plug head 103. When the sunshade seat 107 is removed, the sunshade-hole plug head 103 is plugged into the mounting groove 113, and the quick release button 105 is clamped with the position-limiting groove 131.

In an embodiment, in order to facilitate the mounting of the plug head compression spring 104 and the sunshade-hole plug head 103, the plug head seat 102 is divided into two semi-cylindrical shells along its axis. When the plug head compression spring 104 and the sunshade-hole plug head 103 are mounted into the blind mounting hole 121, the two semi-cylindrical shells are connected by bonding or riveting.

In an embodiment, the sunshade-hole plug head 103 has a blind guide hole 127 extending upward from the lower end surface along the axis of sunshade-hole plug head 103. The plug head compression spring 104 is plugged into the blind guide hole, and the plug head compression spring 104 is position-limited by a side wall of the blind guide hole, which prevents the plug head compression spring 104 from be stuck due to uneven force. The upper end of the plug head compression spring 104 abuts against the bottom surface of the blind guide hole, thereby exerting a thrust on the sunshade-hole plug head 103.

In an embodiment, the quick release button 105 has a through hole 151 penetrating in the thickness direction, the diameter of the through hole 151 is larger than the diameter of the plug-in mounting hole 114, and both the sunshade-hole plug head 103 and the sun sunshade seat 107 can pass through the through hole 151. A locking spring 106 is provided between the quick release button 105 and the bottom of the mounting groove 113. The thickness of the quick release button 105 is smaller than widths of the fixing groove 171 and the limit groove 131, so that the sunshade-hole plug head 103 and the sunshade seat 107 can both be clamped and fixed with the quick release button 105.

In this specific embodiment, the plug head mechanism is mounted in the foldable cart standpipe 9 through the plug head seat 102, the sunshade-hole plug head 103 is mounted in the plug head seat 102, and the sunshade-hole plug head 103 is pushed by the plug head compression spring 104 to abut against the sunshade seat 107. The structure of the plug head mechanism is simple, and also no additional space is needed, so that the volume of the sunshade connecting device is reduced.

In another specific embodiment of the present application, the structure of the sunshade connecting device is shown in FIG. 5 to FIG. 7. The plug head mechanism includes a plug head seat 202 and a sunshade-hole plug head 203, both of which are cylindrical. A clamping ring platform 209 is arranged at the upper end of the plug head seat 202. After a standpipe upper joint 201 is mounted on the foldable cart standpipe 9, a standpipe mounting hole 211 is sleeved on the outer periphery of the foldable cart standpipe 9, and a position-limiting stepped surface 212 is attached to the upper end of the plug head seat 202. The structure of the clamping ring platform 209 can refer to the previous embodiment, which will not be repeated here.

The plug head seat 202 has a blind mounting hole 221 extending downward from the upper end surface along the axis of the plug head seat 202, and the bottom of the blind mounting hole 221 has a through hole 222 penetrating in the axial direction. The sunshade-hole plug head 203 includes a plug head body and a guide rod 232 arranged coaxially, and an upper end of the guide rod 232 is connected to the plug head body. The plug head body is arranged in the blind mounting hole 221 and is in clearance fit with the blind mounting hole 221. The guide rod 232 extends through the through hole 222 to a position below the plug head seat 202. A position-limiting boss 233 extending outward along the radial direction of the guide rod 232 is arranged at a lower end of the guide rod 232. The diameter of the position-limiting boss 233 is larger than the bore diameter of the through hole 222, so the guide rod 232 is in clearance fit with the through hole 222. A plug head compression spring 204 is sleeved on the outer circumference of the guide rod 232 and is located between the plug head body and the bottom of the blind mounting hole 221. The plug head compression spring 204 is in a compressed state, so that the plug head body can be pushed upward to abut against a sunshade seat 207. When a quick release button 205 is detached from a fixing groove 271, the plug head body is pushed by the plug head compression spring 204, so that the sunshade seat 207 is pushed out of a plug-in mounting hole 214. The plug head body continues to move upward until the position-limiting boss 233 attaches to the outer periphery of the through hole 222 to limit the sunshade-hole plug head 203.

In an embodiment, in this specific embodiment, the plug head seat 202 may be divided into two semi-cylindrical shells along the axis of the plug head seat 202. Reference can be made to the previous specific embodiment, which will not be repeated here.

In addition, a position-limiting groove 231 is defined on the outer wall of the plug head body. When the sunshade seat 207 is removed, the sunshade-hole plug head 203 is plugged into the mounting groove 213, and the quick release button 205 is clamped with the position-limiting groove 231.

In an embodiment, the quick release button 205 has a through hole 251 penetrating in the thickness direction, the diameter of the through hole 251 is larger than the diameter of the plug-in mounting hole 214, and the thickness of the quick release button 205 is smaller than widths of the fixing groove 271 and the position-limiting groove 231. Therefore, the quick release button 205 can be clamped and fixed with the sunshade-hole plug head 203 and the sunshade seat 207. In addition, a locking boss 252 is arranged at a lower side surface of the quick release button 205, the mounting groove 213 has a boss sliding groove for cooperating with the locking boss 252, and a locking spring 206 is arranged between the locking boss 252 and the bottom of the boss sliding groove. The locking spring 206 pushes the quick release button 205 towards the opening of the mounting groove 213, so that the quick release button 205 is clamped and fixed with the sunshade-hole plug head 203 or the sunshade seat 207.

In this specific embodiment, the guide rod 232 is arranged on the sunshade-hole plug head 203, and the position-limiting boss 233 is arranged at the lower end of the guide rod 232. The sunshade-hole plug head 203 is position-limited by the cooperation of the position-limiting boss 233 and the through hole 222. The guide rod 232 can effectively limit the moving direction of the sunshade-hole plug head 203 to prevent the plug head compression spring 204 from being stuck.

It should be noted that, relationship terms herein such as first and second are merely used to distinguish an entity from other entities and do not require or imply that there are any such actual relationships or sequences between these entities.

The sunshade connecting device provided according to the present application has been described in detail above. The principle and embodiments of the present application are described through specific examples herein. The description of the above-described embodiments is merely used to facilitate understanding the method and core idea of the present application. It should be noted that several improvements and modifications can be made to the present application by those skilled in the art without departing from the principle of the present application. These improvements and modifications shall fall within the scope of the claims of the present application.

The invention claimed is:

1. A cart having sunshade connecting device, the sunshade connecting device comprising a standpipe upper joint, the standpipe upper joint comprising a standpipe mounting hole that is adapted and configured to receive and be connected with a standpipe of the cart, the standpipe upper joint comprising a plug-in mounting hole, the plug-in mounting hole being adapted and configured to receive a sunshade seat of a sun shade, the standpipe upper joint having a mounting groove, the mounting groove being positioned axially above and opening to the plug-in mounting hole, the mounting groove receiving a quick release button, the quick release button being adapted and configured to engage the sunshade seat when the sunshade seat is received in the plug-in mounting hole and arranged in the mounting groove, the standpipe upper joint comprising a plug head mechanism, the plug head mechanism being adapted and configured to urge the sunshade seat upward and out of the plug-in mounting hole when the sunshade seat is received in the plug-in mounting hole and arranged in the mounting groove; and
wherein the plug head mechanism comprises:
a plug head seat adapted and configured to be inserted in the standpipe of the foldable cart, the plug head seat has a blind mounting hole extending downward from an upper end surface of the plug head seat to a bottom surface of the plug heat seat along an axis of the plug head seat;
a sunshade-hole plug head arranged in the blind mounting hole; and
a plug head pressure spring adapted and configured for urging the sunshade-hole plug head toward the upper end surface of the plug head seat, the plug head pressure spring is arranged at the bottom of the blind mounting hole.

2. The cart according to claim 1, wherein:
the blind mounting hole has a through hole at the bottom of the blind mounting hole extending in an axial direction through the bottom of the blind mounting hole; and
the sunshade-hole plug head comprises a plug head body and a guide rod located below the plug head body, the guide rod is in clearance fit with the through hole of the blind mounting hole.

3. The cart according to claim 2, wherein:
the guide rod has a lower end that extends through the through hole to a position located below the plug head seat, the lower end of the guide rod has a position-limiting boss, and the position limiting boss has a diameter that is larger than a bore diameter of the through hole.

4. The cart according to claim 3, wherein:
the position-limiting boss is arranged on the guide rod to limit motion of the sunshade hole plug out of the blind mounting hole.

5. The cart according to claim 3, wherein:
the plug head pressure spring is sleeved around the guide rod, one end of the plug head pressure spring abuts against a bottom surface of the blind mounting hole, and another end of the plug head pressure spring abuts against the plug head body.

6. The cart according to claim 1, wherein:
the sun-shade hole plug head has a position-limiting groove disposed on an outer side wall of the sunshade-hole plug head, the position-limiting groove of the sunshade-hole plug head is adapted and configured for clamping with the quick release button.

7. The cart according to claim 1, wherein the sunshade-hole plug head has a blind guide hole extending upward from a lower end surface of the sunshade-hole plug head along an axis of the sunshade-hole plug head, and the plug head pressure spring is received in the blind guide hole and abuts against a bottom surface of the blind guide hole.

8. The cart according to claim 1, wherein the plug head seat has a clamping ring platform, the clamping ring platform is circumferentially arranged on an outer side wall located at an upper end of the plug head seat, and when the plug head seat is received into the foldable cart standpipe, the clamping ring platform abuts against an upper end surface of the foldable cart standpipe.

9. The cart according to claim 1, wherein:
the sunshade hole plug has a position-limiting ring platform; and
the plug head seat has a position-limiting platform formed in the blind through hole, the position limiting platform cooperates with the position limiting ring platform of the sunshade-hole plug to limit movement of the sunshade hole plug out of the blind through hole.

10. The cart according to claim 1, wherein the quick release button has a through hole extending to the plug-in mounting hole.

11. The cart according to claim 10, wherein the quick release button is movable within the mounting groove to adjust the position of the through hole relative to the plug-in mounting hole.

12. The cart according to claim 11, further comprising a locking spring arranged between the quick release button and the base of the mounting groove to bias the quick release button.

13. The cart according claim 12, wherein the quick release button has a locking boss, and the locking spring is arranged between the locking boss and the mounting groove.

\* \* \* \* \*